July 2, 1935.  S. G. RUSSELL  2,006,481
FISHING REEL
Filed Dec. 15, 1932  2 Sheets-Sheet 1
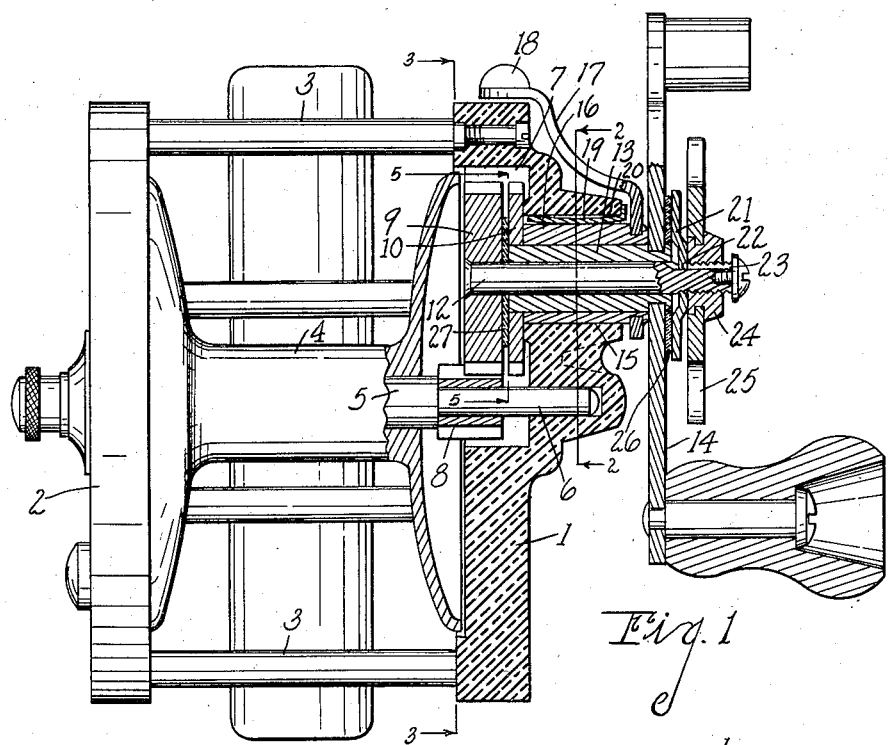
Fig. 1
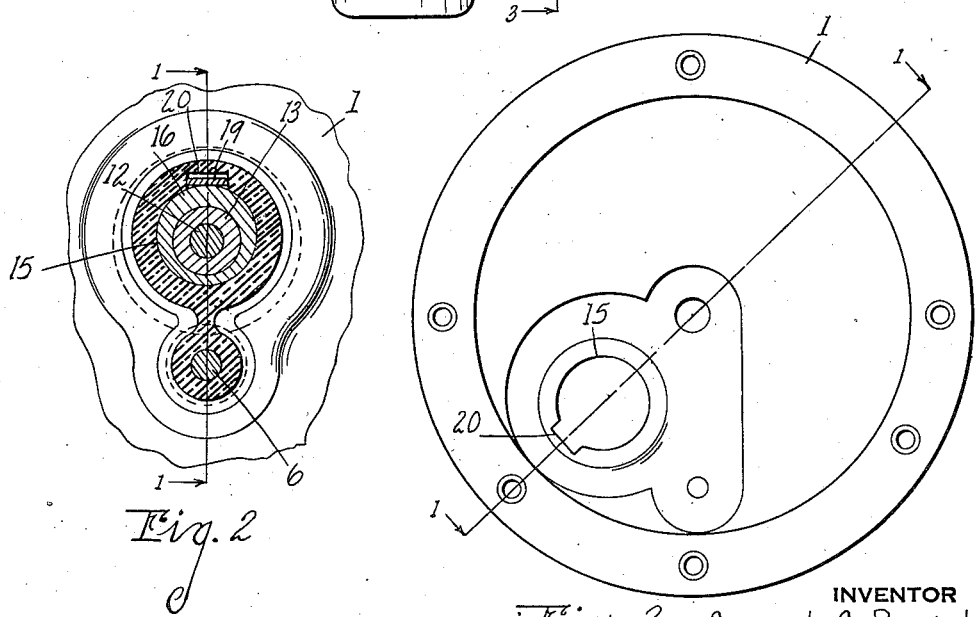
Fig. 2
Fig. 3
INVENTOR
Samuel G. Russell
BY
Chappell & Earl
ATTORNEYS July 2, 1935. S. G. RUSSELL 2,006,481
FISHING REEL
Filed Dec. 15, 1932   2 Sheets-Sheet 2

INVENTOR
Samuel G. Russell
BY
Chappell Earl
ATTORNEYS

Patented July 2, 1935

2,006,481

UNITED STATES PATENT OFFICE 2,006,481

FISHING REEL

Samuel G. Russell, Kalamazoo, Mich., assignor to Shakespeare Company, Kalamazoo, Mich.

Application December 15, 1932, Serial No. 647,361

12 Claims. (Cl. 242—84.7)

The main objects of this invention are:

First, to provide an improved free spool reel in which the spool driving gear may be easily adjusted to drive the spool or to free the same, and at the same time the structure is very simple and compact.

Second, to provide an improved fishing reel in which the crank rotates in line-winding direction only, the mechanism being economical and compact.

Third, to provide a fishing reel mechanism which is well adapted for embodiment in frames having molded heads.

Fourth, to provide a fishing reel having the above advantages, which is very easily manipulated.

Objects pertaining to details and economies of the invention will definitely appear from the description to follow. The invention is defined in the claims.

A structure embodying the features of my invention is clearly illustrated in the accompanying drawings, in which:

Fig. 1 is a fragmentary plan view partially in section on line 1—1 of Figs. 2, 3, 4, 5, and 6, of a fishing reel embodying my invention.

Fig. 2 is a fragmentary view in section on line 2—2 of Fig. 1.

Fig. 3 is a detail inside view of the frame head member on line 3—3 of Fig. 1.

Figures 6, 7:
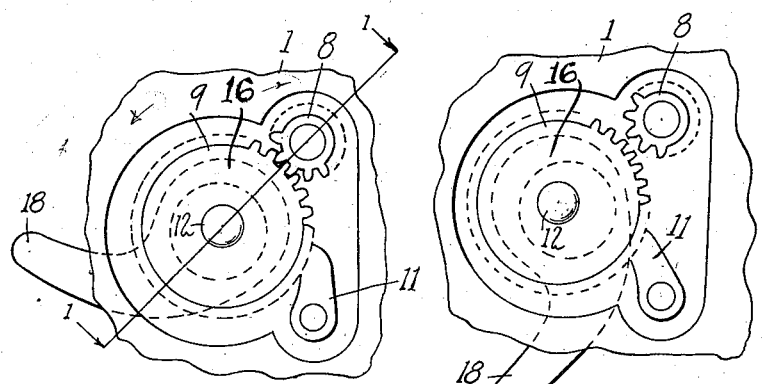
Fig. 6 is a detail view showing the relation of the driving gear to the spool pinion with the driving gear in mesh.
Fig. 7 is a corresponding view with the driving gear in disengaged position.
Figure 5:
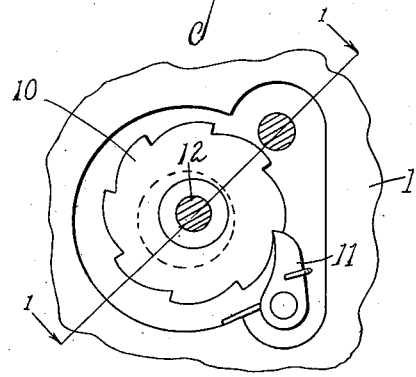
Fig. 5 is a section on line 5—5 of Fig. 1.

In the embodiment of my invention illustrated in the accompanying drawings, the reel frame comprises a head member 1, a tail member 2, and connecting pillars 3. The head and tail members or the end members of the frame are preferably formed or molded of bakelite or other suitable material. The spool 4 is provided with a shaft 5, one end of which is journaled in a bearing 6 formed in the head member. The head member is formed with an inwardly facing recess 7 providing a chamber for the pinion 8 on the spool shaft and a coacting driving gear 9, and also for the ratchet wheel 10 and coating pawl 11. The ratchet teeth and pawl coact to prevent rotation of the hub 13 in one direction but permit its turning in the opposite direction, so as to limit the crank 14 to rotation in line winding direction.

The gear 9 is provided with a spindle 12 which is arranged through the hub 13 of the crank 14. This hub constitutes a bearing for the spindle, that is, the spindle is rotatable in the hub of the crank. The ratchet wheel 10 is mounted on the inner end of the hub of the crank, a friction disk 27 being interposed between the gear and the ratchet wheel.

The head member has a bore 15 opening to the recess 7, the bushing 16 which constitutes a bearing for the hub of the crank being rotatably adjustable in this bore 15. The bearing of hub 13 in the bushing 16 is eccentrically disposed so that upon rotation of the bushing the driving gear is shifted into and out of meshing relation with the pinion 8. A lever 17 is mounted on the outer end of the bushing with its fingerpiece 18 disposed in convenient position for manipulation for shifting the gear into and out of spool driving position, or to free the spool as occasion may require.

The bushing is frictionally held in its adjusted position by means of the bowed blade spring 19 which is arranged in a groove-like recess 20 opening to the bore 15, see Figs. 1 and 2. The spindle has a friction driving connection to the crank, this driving connection constituting a brake for the spool when the spool is rotated in line-unwinding direction.

The clutch or brake disk 21 is provided with a lug 22 engaging the groove or key-way 23 in the outer end of the spindle, thereby providing a splined connection for the disk to the spindle. The adjusting nut 24 is threaded upon the spindle and provided with a star finger-piece 25 for convenience in manipulation. A friction disk or washer 26 is arranged between the clutch disk and the crank.

With this arrangement, the desired braking action or friction is secured by the adjustment of the nut. The driving gear may be shifted into and out of engagement with the spool pinion by manipulation of the lever 17. When the driving gear is in engagement, the desired braking tension on the spool is secured by adjustment of the friction driving connection for the crank to the gear as described.

A feature of considerable importance is the arrangement of the throw of the eccentric to engage and disengage the driving gear so that the pinion, when the spool is rotated in line-winding direction, tends to move the eccentric bushing toward gear-engaging position or tends to hold the gears in mesh. The relation of the eccentric to the gears and relative direction of rotation is indicated in Figs. 6 and 7. In Fig. 6, the gears are shown in mesh and disengaged in Fig. 7. The relative positions of the shift lever are shown by dotted lines.

Figure 4:
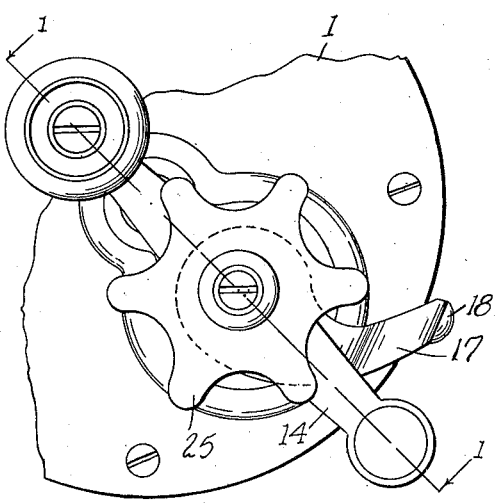
Fig. 4 is a fragmentary end elevation looking from the right of Fig. 1.

As illustrated by Fig. 4, the gears are in mesh when the lever 17 occupies its upper position. In winding the reel, the pressure of the crank is exerted at the center of the spindle and the fulcrum point is, of course, where the gear and pinion teeth mesh, as the pinion due to the pull of the line resists the turning movement. This back pressure therefore tends to throw the lever still further upward and the gears more in mesh than before, as the center of the lever is eccentric to the center of the gear spindle. It is quite natural to suppose that the pressure of the lever should be in the same direction as the crank, but I have found by actual experimentation that the opposite is true for the reasons pointed out above. With my arrangement of the eccentric, the pressure of the crank acts to hold the gears in mesh.

Figure 8:
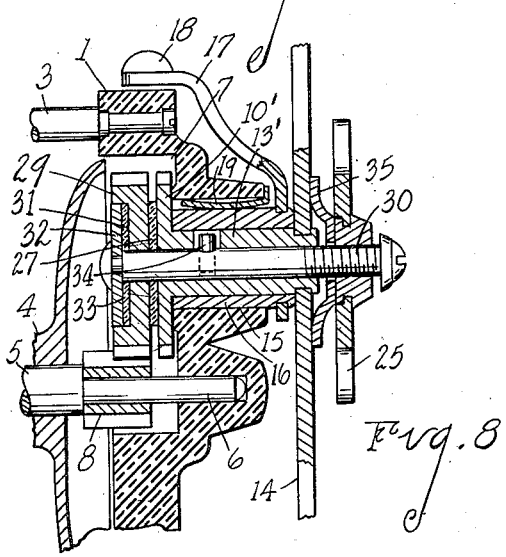
Fig. 8 is a fragmentary section corresponding to that of Fig. 1 of a modified form or embodiment of my invention.

In Fig. 8, I show a modification of my invention in which the driving gear 29 is provided with a frictional driving connection to the spindle 30, the gear 29 having a recess 31 in its inner side receiving the friction disk 32 on the spindle. A facing or fiber disk 33 is disposed on the inner side of the disk 32. The ratchet wheel 10' is integral with the hub 13'.

The friction disk 27 is arranged between the ratchet wheel 10 and the inner side of the gear 29. The spindle 30 is connected to revolve with the hub 13' of the crank by the pin 34 which prevents the star wheel or fingerpiece 25 from rotating when the line is paying out. The spring thrust member 35 of this embodiment in Fig. 8 is not keyed to the spindle as in the embodiment shown in Fig. 1, but is free to rotate with the star wheel and crank, here merely serving as a tension member or means for applying the desired friction to the driving connections for the gear 29 and the spindle.

In the embodiment shown in Fig. 1, the star wheel rotates with the spindle when the line is being paid out so that if it is desired to vary the braking stress at such time it is necessary to manipulate or grasp the star wheel while in motion. This makes it somewhat difficult to secure an accurate adjustment, and this disadvantage is not present in the embodiment shown in Fig. 8.

I have illustrated and described my improvements in an embodiment which I have found highly satisfactory. I have not attempted to illustrate or describe other embodiments which I contemplate, as it is believed this disclosure will enable those skilled in the art to embody or adapt my improvements as may be desired.

Having thus described my invention, what I claim as new and desire to secure by Letters Patent is:

1. In a fishing reel, the combination with a frame including a molded head member recessed on its inner side to provide a gear chamber and having a bore opening to said chamber, a spool journaled in said head member and provided with a pinion disposed in said chamber, a driving gear arranged in said chamber to coact with said pinion, said gear having a spindle fixed thereto, a crank provided with a hub constituting a bearing for said spindle, a bushing rotatable in said bore and having an eccentric bearing for said hub whereby reverse rotation of the bushing shifts the driving gear into mesh with said pinion and forward rotation shifts the driving gear out of such mesh, said bushing being provided with a lever, said head having a groove opening to said bore, a bowed spring arranged in said groove to frictionally retain said bushing in its adjusted positions, a ratchet wheel arranged on the inner end of said crank hub at the side of said gear, a coacting pawl, a brake disk splined to the outer end of said spindle to coact with said crank, and a nut threaded upon said spindle at the outer side of said brake disk and provided with a fingerpiece to facilitate adjustment thereof, the bushing and the eccentric bearing being arranged so that when the crank is turned to rotate the spool in line-winding direction, the resistance of the latter acts to hold the bushing in gear meshing position.

2. In a fishing reel, the combination with a frame including a molded head member recessed on its inner side to provide a gear chamber and having a bore opening to said chamber, a spool journaled in said head member and provided with a pinion disposed in said chamber, a driving gear arranged in said chamber to coact with said pinion, said gear having a spindle fixed thereto, a crank provided with a hub constituting a bearing for said spindle, a bushing rotatable in said bore and having an eccentric bearing for said hub whereby reverse rotation of the bushing shifts the driving gear into mesh with said pinion and forward rotation shifts the driving gear out of such mesh, a ratchet wheel arranged on the inner end of said crank hub at the side of said gear, a coacting pawl, a brake disk splined to the outer end of said spindle to coact with said crank, and a nut threaded upon said spindle at the outer side of said brake disk, the bushing and the eccentric bearing being arranged so that when the crank is turned to rotate the spool in line-winding direction, the resistance of the latter acts to hold the bushing in gear meshing position.

3. In a fishing reel, the combination with a frame including a molded head member recessed on its inner side to provide a gear chamber and having a bore opening to said chamber, a spool journaled in said head member and provided with a pinion disposed in said chamber, a driving gear arranged in said chamber to coact with said pinion, said gear having a spindle fixed thereto, a crank provided with a hub constituting a bearing for said spindle, a bushing rotatable in said bore and having an eccentric bearing for said hub whereby reverse and forward rotation of, respectively, the bushing shifts the driving gear into and out of mesh with said pinion, said bushing being provided with a lever, said head having a groove opening to said bore, a bowed spring arranged in said groove to frictionally retain said bushing in its adjusted positions, a ratchet wheel arranged on the inner end of said crank hub at the side of said gear, a coacting pawl, a friction disk arranged between said gear and ratchet wheel, a brake disk splined to the outer end of said spindle to coact with said crank, a friction washer arranged between said brake disk and crank, and a nut threaded upon said spindle at the outer side of said brake disk, the bushing and the eccentric bearing being arranged so that when the crank is turned to rotate the spool in line-winding direction, the resistance of the latter acts to hold the bushing in gear meshing position.

4. In a fishing reel, the combination with a frame, of a spool provided with a pinion, a driving gear coacting with said pinion and having a spindle, a crank provided with a hub constituting a bearing for said spindle, a rotatable bushing having an eccentric bearing for said hub whereby reverse and forward rotation, respectively, of the bushing shifts the driving gear into and out of mesh with said pinion, a ratchet wheel arranged on the inner end of said crank hub at the side of said gear, a coacting pawl, a friction disk arranged between said gear and ratchet wheel, a brake disk splined to the outer end of said spindle, a friction washer arranged between said brake disk and crank, and a nut threaded upon said spindle at the outer side of said brake disk, the bushing and the eccentric bearing being arranged so that when the crank is turned to rotate the spool in line-winding direction, the resistance of the latter acts to hold the bushing in gear meshing position.

5. In a fishing reel, the combination with a frame, of a spool provided with a pinion, a driving gear coacting with said pinion and having a spindle, a crank provided with a hub constituting a bearing for said spindle, a rotatable bushing having an eccentric bearing for said hub whereby reverse and forward rotation, respectively, of the bushing shifts the driving gear into and out of mesh with said pinion, said bushing being provided with a lever, a spring acting to frictionally retain said bushing in its adjusted positions, a ratchet wheel arranged on the inner end of said crank hub at the side of said gear, a coacting pawl, a brake disk splined to the outer end of said spindle, and a nut threaded upon said spindle at the outer side of said brake disk and provided with a fingerpiece to facilitate adjustment thereof, the bushing and the eccentric bearing being arranged so that when the crank is turned to rotate the spool in line-winding direction, the resistance of the latter acts to hold the bushing in gear meshing position.

6. In a fishing reel, the combination with a frame, of a spool provided with a pinion, a driving gear coacting with said pinion and having a spindle, a crank provided with a hub constituting a bearing for said spindle, a rotatable bushing having an eccentric bearing for said hub whereby reverse and forward rotation, respectively, of the bushing shifts the driving gear into and out of mesh with said pinion, a ratchet wheel arranged on the inner end of said crank hub at the side of said gear, a coacting pawl, a brake disk splined to the outer end of said spindle, and a nut threaded upon said spindle at the outer side of said brake disk, the bushing and the eccentric bearing being arranged so that when the crank is turned to rotate the spool in line-winding direction, the resistance of the latter acts to hold the bushing in gear meshing position.

7. In a fishing reel, the combination with a frame, of a spool provided with a pinion, a driving gear coacting with said pinion and having a spindle, a crank provided with a hub constituting a bearing for said spindle, a bearing member rotatable in said frame and having an eccentric bearing for said hub whereby reverse and forward rotation respectively, of the bushing shifts the driving gear into and out of mesh with the pinion, a ratchet means on said hub and frame for limiting rotation of said crank to line-winding direction, and an adjustable friction driving connection for said crank to said spindle, said eccentric bearing acting to use the resistance of the spool to line-winding to urge the driving gear into mesh with the pinion.

8. In a fishing reel, the combination with a frame, of a spool provided with a pinion, a driving gear coacting with said pinion, a crank provided with a hub rotatably supporting said gear and with which said gear has a friction driving connection, a ratchet means on said hub and frame for limiting the rotation of said crank to line-winding direction, means for adjusting the friction driving connections for said gear to said crank, and a bearing for said hub eccentrically mounted in said frame for rotative adjustment and so that it is rotated to mesh the gears in the direction opposite to that in which the crank is rotated to drive the spool in line-winding direction.

9. In a fishing reel, the combination with a frame, of a spool provided with a pinion, a driving gear coacting with said pinion and having a spindle, a driving disk on said spindle having frictional engagement with said gear, a crank provided with a hub through which said spindle is disposed and to which it is pinned to permit axial movement of the spindle, a bearing for said crank hub eccentrically mounted in said frame for rotative adjustment whereby reverse and forward rotation, respectively, of said bearing shifts the driving gear into and out of mesh with the pinion, a compression spring on the outer end of said spindle, and a nut threaded on said spindle at the outer side of said spring, said eccentric mounting being such that the resistance of the spool to line-winding acts to urge the bearing to gear meshing position.

10. In a fishing reel, the combination with a frame, of a spool provided with a pinion, a driving gear coacting with said pinion and having a spindle, said gear having a friction driving connection with said spindle, a crank provided with a hub constituting a support for said spindle, the spindle being rotatable with said hub, a bearing for said hub having an eccentric mounting in said frame whereby upon reverse and forward rotation, respectively, of the bearing the gear is shifted into and out of mesh with the pinion, a ratchet means on said hub and frame for limiting the rotation of said crank to rewinding direction, and means for longitudinally adjusting said spindle for varying the friction of said driving connection for said gear thereto, said eccentric mounting being such that the resistance of the spool to line-winding acts to urge the bearing to gear meshing position.

11. In a fishing reel, the combination with a frame, of a spool provided with a pinion, a driving gear coacting with said pinion and having a spindle, said gear having a friction driving connection with said spindle, a crank provided with a hub constituting a support for said spindle, the spindle being rotatable with said hub, a bearing for said hub having an eccentric mounting in said frame whereby upon reverse and forward rotation, respectively, of the bearing the gear is shifted into and out of mesh with the pinion, and a ratchet means on said hub and frame for limiting the rotation of said crank to rewinding direction, said eccentric mounting being such that the resistance of the spool to line-winding acts to urge the bearing to gear meshing position.

12. In a fishing reel, the combination with a frame, of a spool provided with a pinion, a driving gear coacting with said pinion and having a spindle, said gear having a friction driving connection with said spindle, a crank provided with a hub constituting a support for said spindle, the spindle being rotatable with said hub, a bearing for said hub having an eccentric mounting in said frame whereby upon reverse and forward rotation, respectively, of the bearing the gear is shifted into and out of mesh with the pinion, and means for longitudinally adjusting said spindle for varying the friction of said driving connection for said gear thereto, said eccentric mounting being such that the resistance of the spool to line-winding acts to urge the bearing to gear meshing position.

SAMUEL G. RUSSELL.